May 25, 1948.                    E. V. SORENY                    2,442,327
          REFLEX CAMERA WITH ERECTING AND REDUCING OPTICAL FINDER SYSTEM
                    Filed June 29, 1945         3 Sheets-Sheet 1
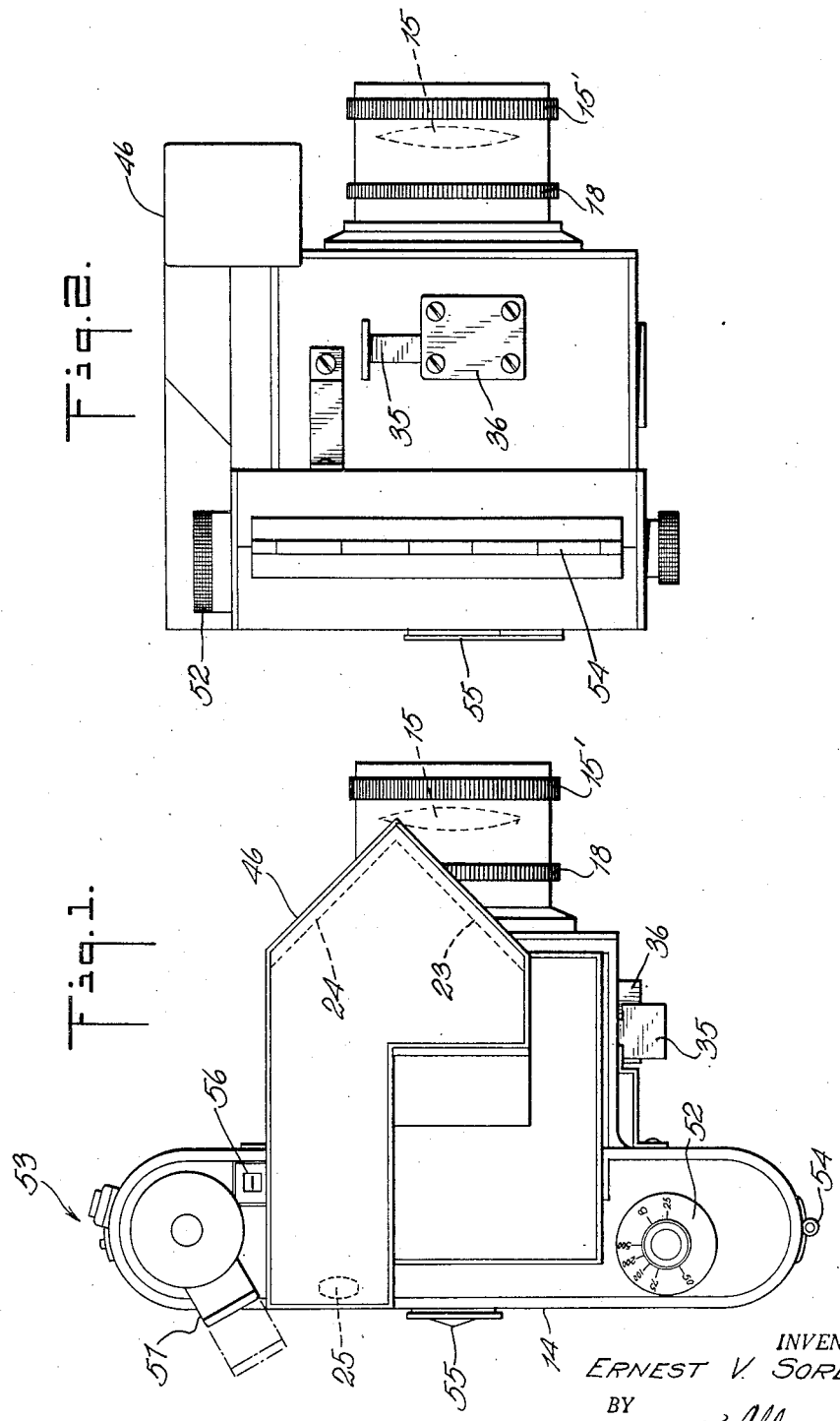
INVENTOR.
ERNEST V. SORENY
BY
*L. S. Allyn*
ATTORNEY

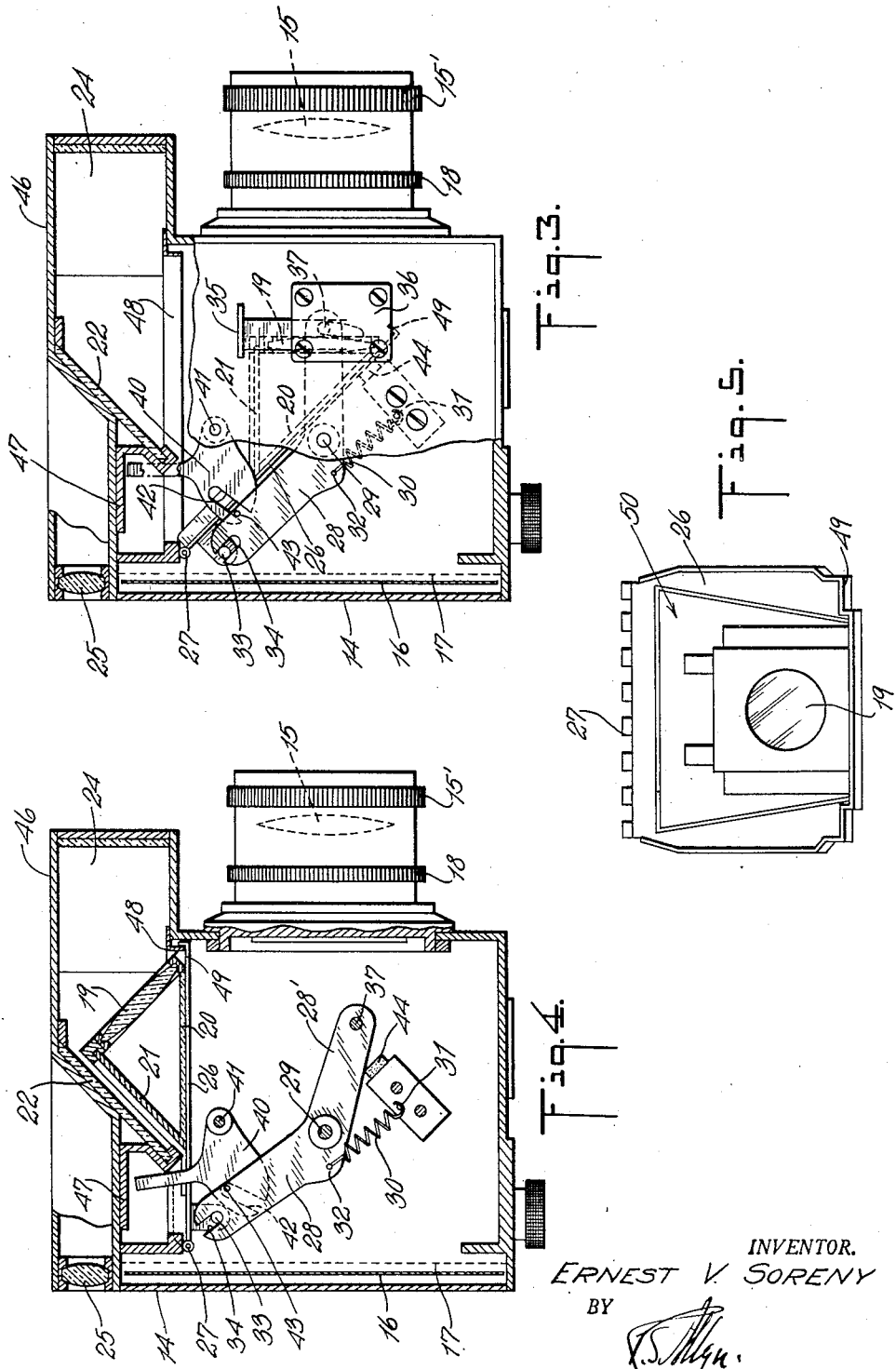

May 25, 1948.  E. V. SORENY  2,442,327
REFLEX CAMERA WITH ERECTING AND REDUCING OPTICAL FINDER SYSTEM
Filed June 29, 1945  3 Sheets-Sheet 3
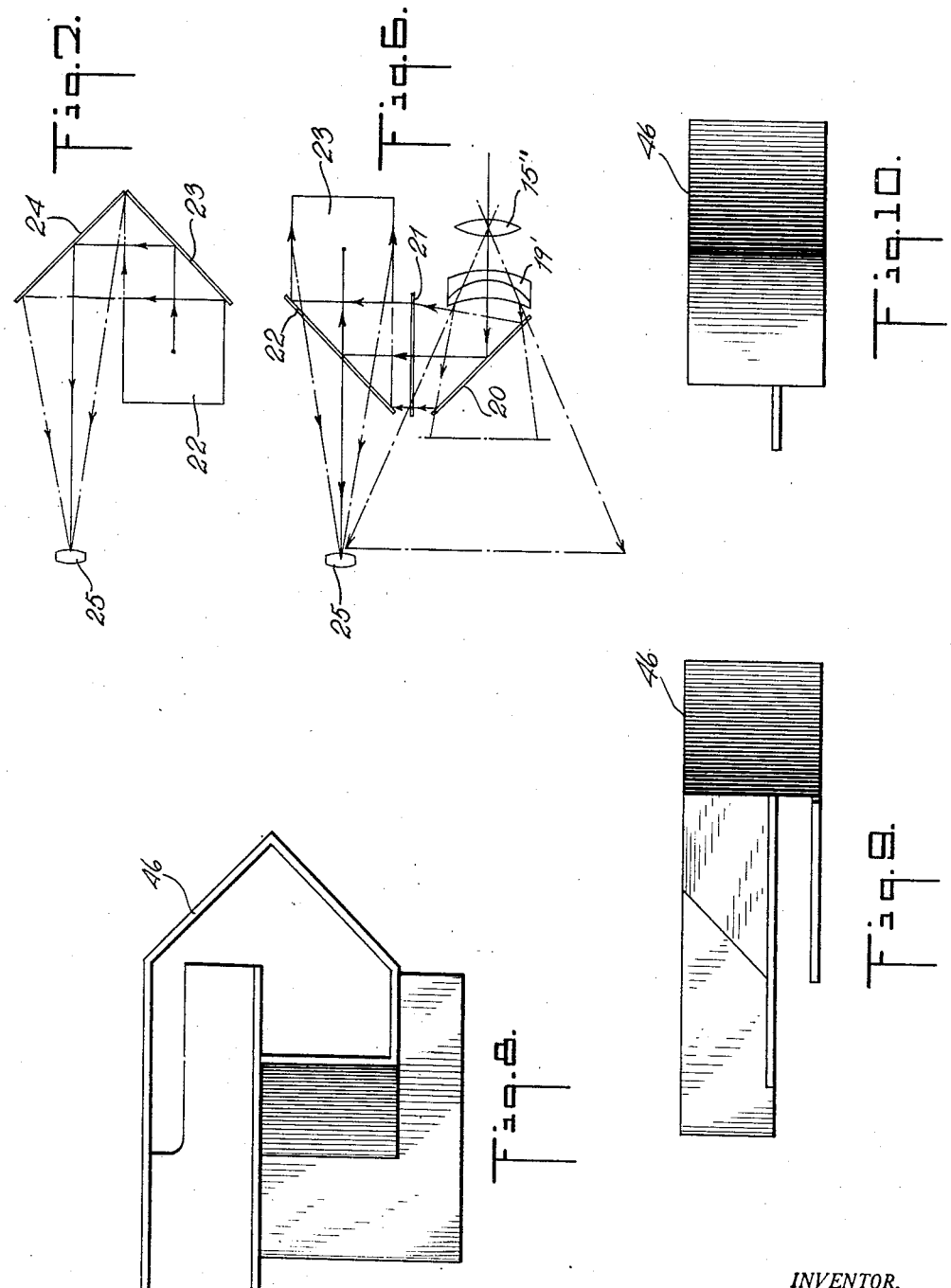
INVENTOR.
ERNEST V. SORENY
BY
ATTORNEY Patented May 25, 1948

2,442,327

UNITED STATES PATENT OFFICE 2,442,327

REFLEX CAMERA WITH ERECTING AND REDUCING OPTICAL FINDER SYSTEM

Ernest V. Soreny, New York, N. Y., assignor to J. A. Maurer, Inc., Long Island City, N. Y., a corporation of New York Application June 29, 1945, Serial No. 602,202

3 Claims. (Cl. 95—42)

My invention relates to photographic cameras and particularly to means for clearly and easily viewing the entire object to be photographed and at the same time permitting focusing the camera in order to quickly and accurately compose the picture to be taken.

The ordinary reflex camera employing a ground glass screen is cumbersome and shows the scene reversed, that is, things at the right are shown at the left and vice versa. Efforts to overcome this defect have been made but so far as I know no simple, compact, inexpensive and commercial device has appeared in which the operator can look straight forward into the camera and see the entire picture to be taken in erect and correct left to right fashion as seen by the naked eye and at the same time focus the camera and instantly take the picture.

One object is to provide simple and reliable means for reducing the size of the image and yet showing all or substantially all of the view to be taken and showing it right side up and in an erect position and in a correct left to right viewing position as the scene appears to the naked eye.

Another object is to provide an eye-level viewing device.

Another object is to provide in such a construction the facility of focusing the objective lens while observing the effect of the focusing operation.

Another object is to provide a camera of this kind that is compact, easy to inspect and inexpensive to manufacture.

It is a well-known fact that due to the crossing of light rays in the objective of a photographic camera, all images produced at the focal plane of the film are inverted around both axes. It is the main objective to reverse such image by the process known as inversion for which I shall use in effect a Porro prism system of the first type. This system is actually the combination of two Porro prisms located perpendicular to one another. In my design, the first is made up of a first reflecting mirror, which incidentally reflects the image upon a ground glass screen, and a second reflecting mirror placed over the plane of the ground glass screen at 45 degrees. The second Porro prism is made up of the third and fourth mirrors of the camera. These two pairs of mirrors perpendicularly mounted to one another will cause an inversion of the real image created on the ground glass focusing screen. By the addition of an eye-piece, I am able to enlarge the real image formed on the ground glass screen so that an enlarged image seen will be a distinct replica of the subject to be photographed.

By introducing an auxiliary lens behind the objective, I have produced an image upon the ground glass screen that is located much closer to the principal point of the taking lens than the image that can be produced at the focal plane located at the focal distance of the taking lens. By applying the inverse square law to the surface of my ground glass screen, I have increased the brightness of the subject appearing on the same. In other words, my focusing screen, as viewed through the eye-piece and reflected by mirrors in prismatic arrangement, will show the same outlines, definition, depth of focus, but improved relative brightness of the subject as will appear on the negative. The enlarged image seen by the observer will be erect and nonreversed, bright and permits critical focusing by a built-in magnifier (not shown), as well as adjustment of the extent of definition towards both the foreground and background and, lastly, composition of the photograph before the negative is exposed.

In the form of the invention shown and described herein I provide an optical system including the usual objective lens, an auxiliary lens and and eye-piece or lens with ground glass, a series of inclined mirrors arranged in pairs between the auxiliary lens and the eye-piece so that the operator can look through the eye-piece and see on the ground glass exactly the same field as will be exposed to the films and at the same time can focus the objective lens. The auxiliary lens and the adjacent mirror are retractable out of the optical axis of the objective lens when the shutter is released to take the picture. A ground glass screen is located between the first two mirrors at the proper focal distance and is movable with the auxiliary lens.

The details of one form of construction embodying my invention are shown in the accompanying drawings and described hereinafter.

Fig. 1 is a plan view of one form of camera embodying my invention, parts being broken away.

Fig. 2 is a side view of the same.

Fig. 3 is a partial side and vertical sectional view of the camera showing the auxiliary lens and its connected mirror and screen in the observing or focusing position.

Fig. 4 is a partial section and side view showing the auxiliary lens and its connected mirror and screen in the retracted position when the picture is ready to be or is being taken.

Fig. 5 is a front view of the support for the auxiliary lens and its mirror.

Figs. 6 and 7 are diagrammatic views of the optical system, Fig. 6 showing a side view and Fig. 7 a plan view.

Fig. 8 is a plan view of the housing for the fixed mirrors.

Fig. 9 is a side view and partial section of the housing for the fixed mirrors.

Fig. 10 is an end view of said housing.

The casing or body 14 may be of any suitable construction and has an objective lens 15 with a focusing ring 15' of any suitable type. The invention is applicable to any type of picture framing member such as a sensitive film or plate 16 and may have any suitable type of shutter such as a focal plane shutter 17 of variable aperture type. It may also have a diaphragm with adjusting ring 18.

The principal elements of the viewing system consist of an auxiliary lens 19, a first mirror 20, a ground glass screen 21, mirrors 22, 23 and 24 and an eye-piece or magnifying lens 25.

The combined focal length of the objective and the auxiliary lens is equal to the distance along the axis to the first mirror and thence to screen 21. The diverging rays of the objective lens are intersected by the auxiliary lens which causes them to converge to such an extent as to produce a reduced image.

The focal length of the lens 25 is equal to the sum of distances along the optical axis of the system, namely to distances from the top of the ground glass screen 21 to the principal point of the eye-piece 25. Therefore, the picture to be composed can be viewed by looking through eye-piece 25 and the sharpness of the former can be controlled, or in other words, the object to be photographed can be brought into sharp focus by rotating the adjusting ring 15' of the objective lens 15.

Parts 19, 20 and 21 of the optical system are carried by a frame 26 pivoted at 27 so that they can be moved into position for viewing the scene to be taken and retracted when the picture is taken. The shutter normally conceals the sensitive film regardless of the position of the mirror 20.

A lever 28 is pivoted at 29 in the casing and under tension of spring 30 which has one end connected to a stationary anchor 31 and its other end to a lug 32 on the lever 28. The frame 26 has a stud 33 which extends into a slot 34 in lever 28. In this way the spring 30 tends to move and hold the frame in the position of Fig. 3. In this position, when the objective lens is focused properly for taking the picture on the sensitive film, the reduced image is reflected onto the ground glass screen 21 and reflected from mirrors 22 and 23 and 24 and seen through the eye-piece 25 magnified, in erect and correct left to right fashion.

A release plunger 35 is mounted in a housing 36 on the outside of the camera body convenient for the finger and has a stud 37 which engages the forward arm 28' of the lever 28. By pressing the plunger 35, the lever 28 may be tilted from the normal position of Fig. 3 to that of Fig. 4 to retract the frame 26 with the lens 19, mirror 20 and screen 21. A shutter-release lever 40 is pivoted at 41 and has a circular slot or notch 42 in which a pin or stud 43 on the lever 28 slides.

In order to take a picture, when the camera has been focused properly, the plunger 35 is depressed so as to lift the auxiliary lens and its frame from the position of Fig. 3. Just before the parts reach the position of Fig. 4, the lever 40 will have been tilted by such movement and the shutter (not shown) released. Any conventional shutter may be used that will automatically expose and cover the film as the lever 40 releases it. When the plunger is released, it and the tray 26 and parts will be returned to the position of Fig. 3 by the action of the spring 30. A pad 44 on each side of the body may be provided to serve as abutments and for properly positioning the frame when it is urged into normal lower position.

In the form herein shown, the mirrors 22, 23 and 24 and the eye-piece 25 are all carried by a hood or cover housing 46 suitably secured to the upper part of the camera body or casing. The lower edge of the mirror 22 is held in place by a bracket 47.

A flange 48 depends from an opening in the bottom of the hood and the frame 26 has a flange 49 adapted to overlap the lower edge of flange 48 so as to shut off light entering through the eye-piece when the frame or tray is raised. It will be understood that the joints may be provided with black velvet or the like to ensure light tightness.

The tray or frame 26 may have a recess 50 for the mirror 20.

Figs. 6 and 7 show diagrammatically one form of optical system with lenses 15'' and 19' different from those of Figs. 3 and 4. The design and location of the lenses and the position of the ground glass screen however follow the same laws as heretofore described.

The invention is applicable to any type of film pack or roll which can be actuated in any suitable manner as for instance by a shutter and film spool winding lever 51 with a speed adjusting knob 52 and a lock and latch assembly 53. The back panel may be hinged at 54. A suitable film window 55 and a counting window 56 may be provided.

Changes in details may be resorted to without departing from the principle or scope of the invention.

I claim:

1. In a camera having an objective lens arranged in front of a sensitive film, an optical unit comprising a hinged mirror inclined at an angle of forty-five degrees to the optical axis of the lens, an auxiliary lens between said objective lens and said mirror and a screen parallel with said axis and at an angle of forty-five degrees to the plane of said mirror for receiving the reduced image impressed thereupon by said mirror, a pair of mirrors arranged at an angle of ninety degrees to each other and in planes substantially perpendicular to the plane of said screen, another relatively fixed mirror inclined at an angle of forty-five degrees to the optical axis of the objective lens and inclined at an angle of ninety degrees to the first-mentioned mirror when the latter is in viewing position for reflecting the image from the screen to the first mirror of said pair of mirrors, and an eye-piece in line with the other mirror of said pair of mirrors whereby the entire object to be photographed is seen through the eye-piece in erect position and in correct left to right position as viewed by the naked eye, said optical unit being mounted to swing so as to bring its screen substantially parallel with said relatively fixed mirror and so as to bring the auxiliary lens and the first-mentioned mirror in between the relatively fixed mirror and the first of said pair of mirrors.

2. In a camera having a picture framing member and an objective lens with its optical axis normal to said member, a picture finding system comprising a mirror hinged to an axis transverse to the optical axis of the objective lens to swing between the objective lens and said framing member, the plane of said mirror when between said lens and said framing member being inclined to an angle of forty-five degrees to said optical axis, the plane of said mirror when swung from said inclined position being substantially parallel with said optical axis, a reducing lens, the optical axis of said reducing lens coinciding with the optical axis of said objective lens when the mirror is between said objective lens and said framing member for impressing upon said mirror substantially the entire image from the objective lens but of a smaller size, a screen arranged in a plane at forty-five degrees to said mirror for receiving said entire reduced image as reflected from said mirror, said reducing lens and said screen being connected to said mirror to move therewith as a unit, a second mirror arranged in a plane at forty-five degrees to the optical axis of the objective lens and inclined at an angle of forty-five degrees to the plane of the framing member for receiving and reflecting the image cast upon said screen, a third mirror arranged in a plane at an angle of forty-five degrees to the optical axis of the objective lens and at an angle of forty-five degrees to the plane of said framing member for receiving and reflecting the image cast upon said second-mentioned mirror, a fourth mirror arranged in a plane at an angle of ninety degrees to the third mirror and at an angle of forty-five degrees to the optical axis of the objective lens for receiving and reflecting an image from the third mirror, a magnifying eye-piece arranged in a plane at forty-five degrees to the plane of the fourth mirror and having its optical axis parallel with the optical axis of the objective lens for viewing the entire image reflected from the fourth mirror in erect position and in correct left to right viewing position whereby the entire field of the picture focused by the objective lens may be seen by looking through the eye-piece in the direction parallel with the optical axis of the objective lens and means for removing the first mirror, screen and reducing lens as a unit from between said objective lens and said framing member to a position where the screen and the reducing lens are housed between the second and third mirrors.

3. A camera comprising a casing having an open top, a hollow hood on said top and having an opening communicating with the interior of the casing, a frame member hinged to said casing adjacent its top, a picture framing member at the rear of said casing, an objective lens at the front of the casing with its optical axis normal to said picture framing member, a mirror carried by said frame member and normally disposed at an angle of forty-five degrees to the optical axis of said objective lens, and adapted to be swung to a plane substantially parallel with said optical axis, a reducing lens carried by said frame member in front of said mirror and having its optical axis normally coinciding with the optical axis of said objective lens for impressing upon said mirror substantially the entire image from the objective lens at a reduced scale, a screen carried by said frame member above said mirror and reducing lens and arranged in a plane at forty-five degrees to said mirror for receiving the entire reduced image as reflected from said mirror, a second mirror fixed on the hood above said hinged frame and arranged in a plane at forty-five degrees to the optical axis of the objective lens for receiving and reflecting the image cast upon said screen, a third mirror fixed in said hood and disposed in a plane at an angle of forty-five degrees to the optical axis of the objective lens and at an angle of ninety degrees to the plane of the second fixed mirror for receiving and reflecting the image cast upon said fixed mirror, a fourth mirror fixed in said hood and arranged in a plane at an angle of ninety degrees to the third-named mirror and at an angle of forty-five degrees to the optical axis of the objective lens for receiving and reflecting an image from the third-named mirror, a magnifying eye-piece fixed in said hood and arranged in a plane at forty-five degrees to the plane of the fourth-named mirror and having its optical axis parallel with the optical axis of the objective lens for viewing the entire image reflected from the fourth-named mirror in erect position and in correct left to right fashion whereby the image of the entire field of the picture focused by the objective lens may be seen by looking through the eye-piece in the direction parallel with the optical axis of the objective lens and means for swinging said hinged frame member with said first-named mirror, screen and reducing lens from its normal position between said objective lens and said framing member to a position where the screen and the reducing lens are housed between the second and third mirrors.

ERNEST V. SORENY.

REFERENCES CITED

The following references are of record in the file of this patent:

UNITED STATES PATENTS

| Number | Name | Date |
| --- | --- | --- |
| 624,517 | Mercer | May 9, 1899 |
| 1,279,164 | Ruttan et al. | Sept. 17, 1918 |
| 1,310,776 | Akeley | July 22, 1919 |
| 1,602,483 | Freeman | Oct. 12, 1926 |
| 2,311,822 | Frankel | Feb. 23, 1943 |
| 2,364,652 | Pollock | Dec. 12, 1944 |

OTHER REFERENCES

A. P. C. Publication of Kuppenbender, Serial No. 304,702, published May 4, 1943 (abandoned).